June 7, 1960 W. A. RAY 2,939,523
SAFETY VALVE AND SYSTEM FOR GASEOUS FUEL BURNERS
Filed July 20, 1951 5 Sheets-Sheet 4
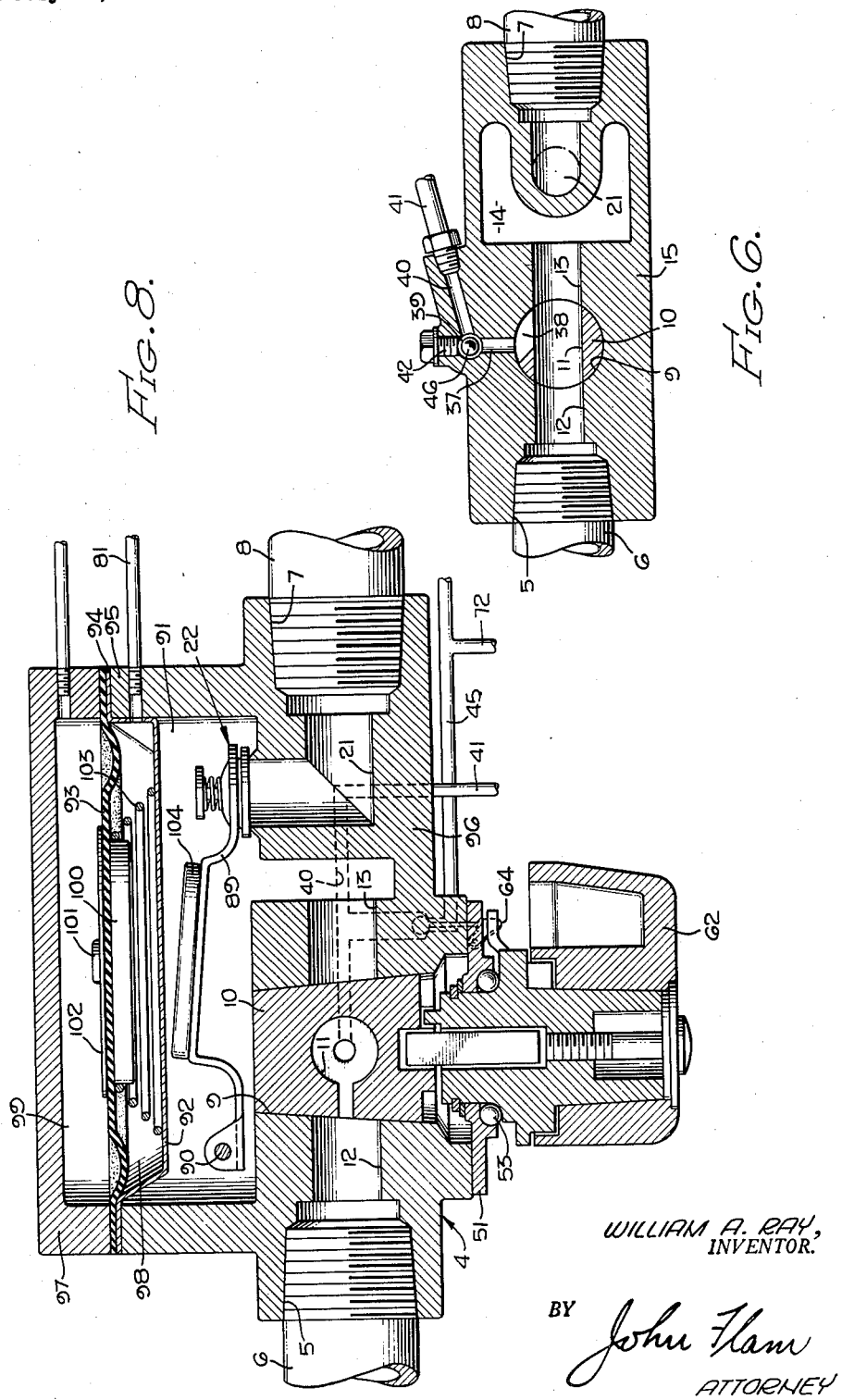
WILLIAM A. RAY,
INVENTOR.
BY John Ham
ATTORNEY

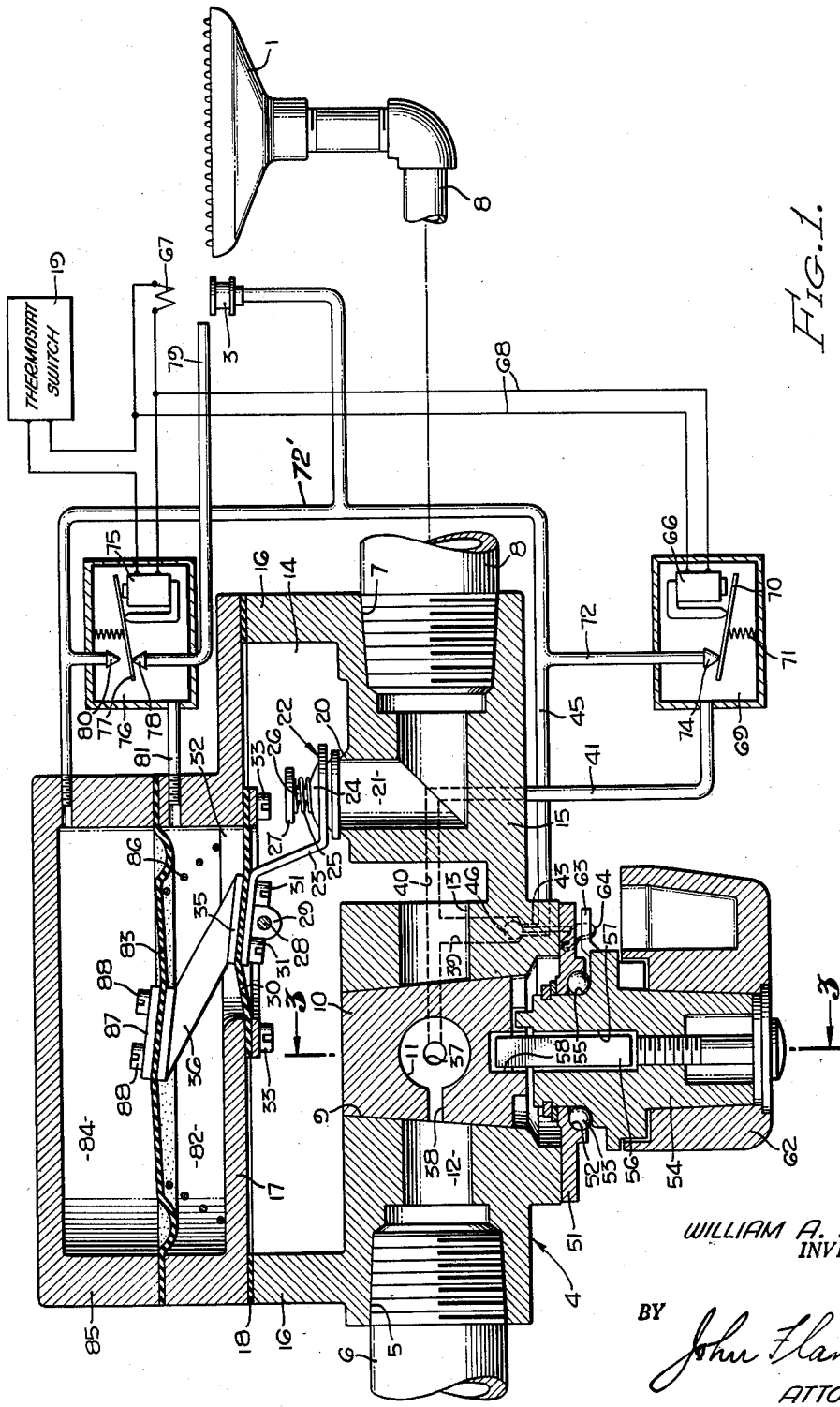

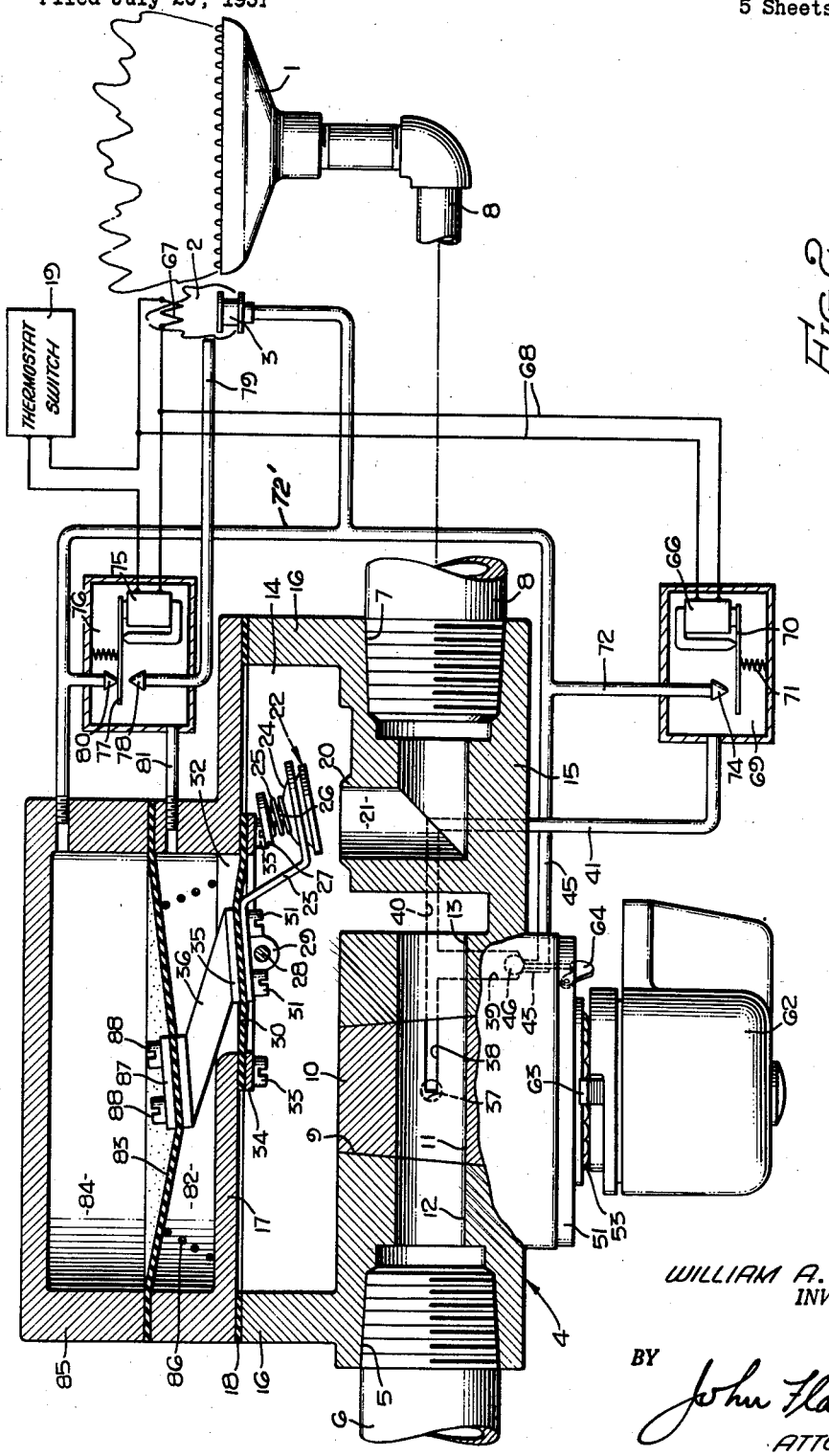

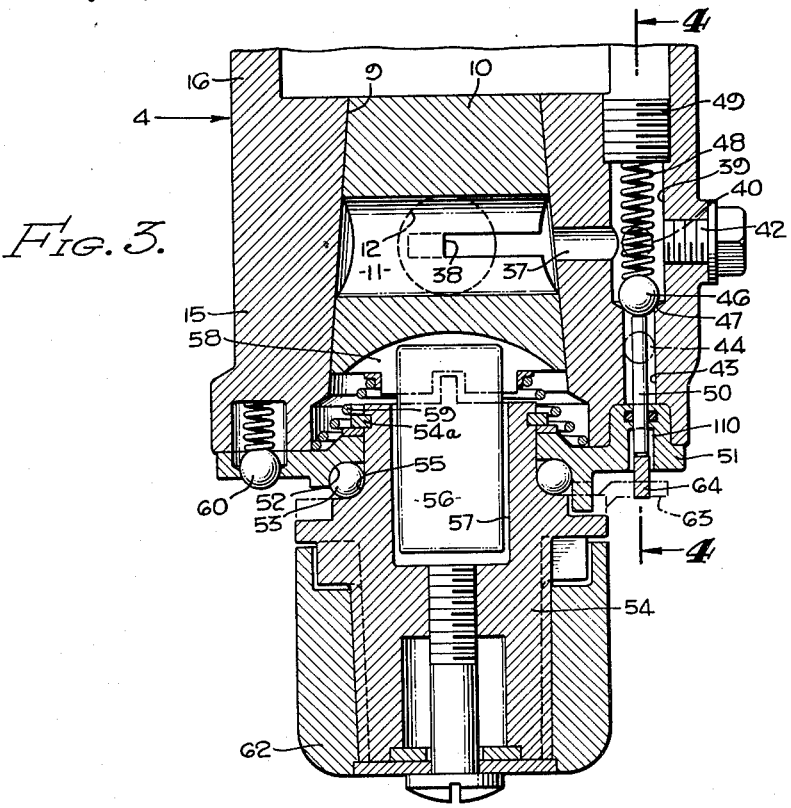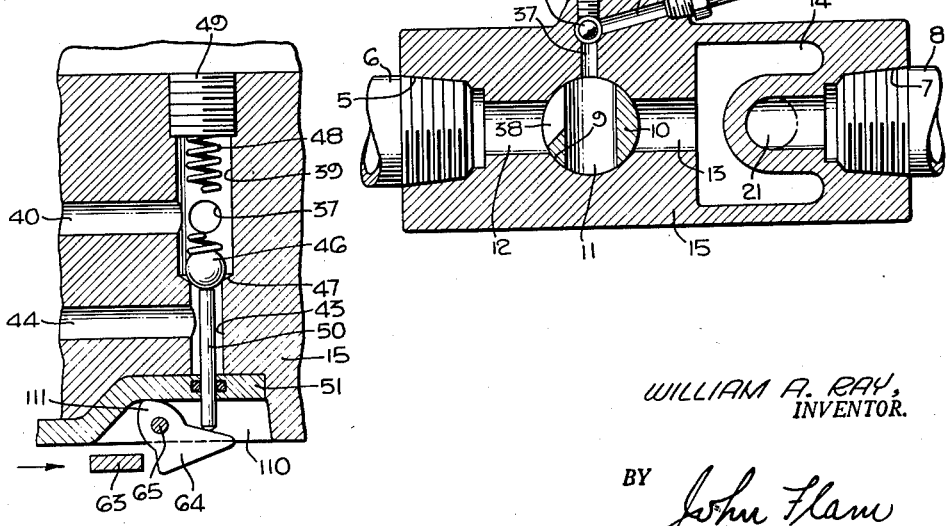

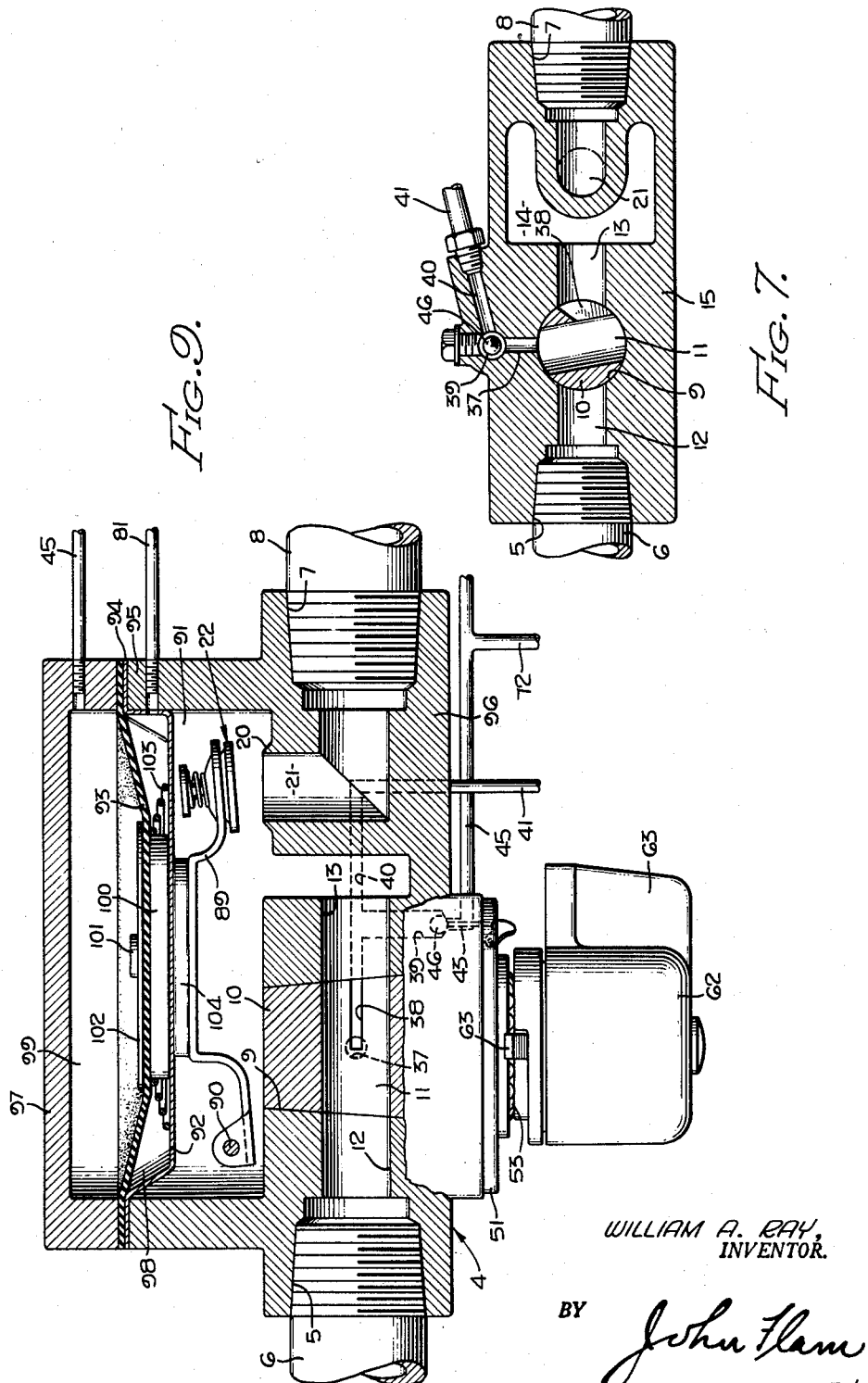

United States Patent Office 2,939,523
Patented June 7, 1960

2,939,523

SAFETY VALVE AND SYSTEM FOR GASEOUS FUEL BURNERS

William A. Ray, North Hollywood, Calif., assignor to General Controls Co., a corporation of California Filed July 20, 1951, Ser. No. 237,704

11 Claims. (Cl. 158—131)

This invention relates to a valve and a system for controlling the flow of gas to a burner. This application is a continuation-in-part of an application filed in the name of William A. Ray on December 7, 1946, under Serial No. 714,794, now Patent No. 2,615,511, issued October 28, 1952; and entitled: Automatic Pressure Controlled Valve System for Fluid Fuel Burners.

It is common to provide a pilot burner that is intended at all normal times to be used to ignite a main burner when gas or other fluid fuel is passed to the burner. Accidental failure of the pilot flame may occur. Safety systems have heretofore been proposed and used to interrupt the flow of fuel to the main burner. Usually this is accomplished by the aid of a thermoelectric generator operated by the heat of the pilot flame for maintaining the system in operation. When the generator cools, due to the failure of the pilot flame, a safety valve is closed, stopping flow of fuel to the system. To initiate operation of the burner, the pilot burner must be relighted, but the safety valve cannot be maintained in position until after the pilot flame is in existence and the thermoelectric generator is active.

It is one of the objects of this invention to improve, in general, systems of this general character.

It is another object of this invention to simplify the operation of resetting the system after pilot flame failures.

It is convenient to use a rotary plug valve for controlling the rate of flow to the main burner. It is another object of this invention to incorporate with such a valve a safety valve that shuts off all fuel to both the pilot and main burners in the event of pilot flame failure.

It is still another object of this invention to provide a combination safety valve and plug valve in which the operation of the safety valve is effected in a simple and inexpensive manner by the aid of fluid pressure derived from the source of fuel supply.

It is still another object of this invention to provide a system in which opening and closing of the safety valve occur, in normal operation, in response to operation of a limiting control, such as a room thermostat.

It is still another object of this invention to make it possible completely to interrupt the flow of fuel to the main burner and the pilot burner by a shut-off valve that stops the flow of fuel to the valve under the control of the thermostat. The shut-off valve may be of the usual plug cock type. Accordingly, manual operation of this plug valve or cock ensures that no gas whatever can flow to the system for control purposes, for the pilot burner, or for the main burner. Thus, an effective seasonal shut-off is readily accomplished.

The cock is also preferably so arranged that the system may be shut off except for the pilot light. In this position, the automatic valve is ineffective, even when open, to pass fuel to the main burner, although the thermostat may demand heat. By operating the shut-off valve or cock to open position, the opening and closing of the automatic valve, as required by the thermostat, may then be effected without the necessity of re-establishing the pilot flame. Thus, temporary interruptions of activity (as, for example, during the warmer periods of a day) are provided for without going through a pilot igniting process.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a diagrammatic view of a system incorporating the invention, the valve structure being shown in section, the system being in inactive condition;

Fig. 2 is a view similar to Fig. 1, but illustrating the system in active position;

Fig. 3 is an enlarged sectional view, taken along a plane corresponding to line 3—3 of Fig. 1;

Fig. 4 is a sectional view, taken along a plane corresponding to line 4—4 of Fig. 3;

Figs. 5, 6, and 7 are diagrammatic sectional views illustrating different positions of the control valve;

Fig. 8 is a sectional view of a modified form of valve structure, the parts being shown in the inactive position;

Fig. 9 is a view similar to Fig. 8, but illustrating the valve in active position.

In the form of the invention illustrated in Figs. 1 to 7, inclusive, a main burner 1 is illustrated adapted to be ignited by the flame 2 of the pilot burner 3.

The supply of gaseous fuel to the main burner is controlled by a main valve structure 4. The valve body 15 of this main valve structure 4 has an inlet 5 connected to a conduit 6 leading to an appropriate source of gas supply. At the opposite end of the valve structure, there is an outlet 7 communicating with an outlet conduit 8. This outlet conduit 8 may be directly connected to the main burner 1.

A main shut-off valve structure is disposed immediately adjacent the inlet 5, and may include, for example, a conical valve seat 9 in which is seated a rotatable plug closure or cock 10. This plug closure has a through port 11 which is adapted to place the body ports 12 and 13 into communication when it is desired to render the system active. This position of the plug closure 10 is illustrated in Figs. 2 and 6. The port 12 is in immediate communication with the inlet 5 and the inlet conduit 6. This port 12 thus constitutes the inlet port for the plug valve structure.

The outlet port 13 communicates with a chamber 14 (see, also, Figs. 5, 6, and 7). This chamber 14 is defined by the flange 16 of the valve body 15 and a wall 17 attached to the flange 16. An appropriate gasket 18 may be interposed between these parts.

Passage of fuel to the main burner 1 is controlled, as well, by a supplemental valve interposed between the outlet port 13 and the outlet conduit 8. This supplemental valve, as hereinafter explained, responds to the requirements of the space to be heated, as by the aid of a thermostatic switch 19, and in a manner to be hereinafter described. When the thermostatic switch demands more heat, the supplemental valve is opened and, provided that the shut-off valve structure including the plug 10 is also open, then fuel may be supplied to the burner 1, and it may be ignited, as indicated in Fig. 2.

The supplemental valve structure is formed, in this instance, by a valve seat 20 disposed around a port 21 leading to the outlet conduit 8. Cooperating with this valve seat 20 is a conformable closure member 22 carried at the end of a lever arm 23. In order to support the closure member 22 in such a way as to permit it to conform to the valve seat 20, the lever 23 may be provided with a spherical socket member 24 into which a corresponding surface of the closure member 22 may fit. A compression spring 25 urges the two surfaces resiliently together. The closure member 22 may be provided with a central post 26 passing through a clearance aperture in member 24. This post carries a collar 27 to form an abutment for the upper end of the spring 25.

The lever 23 is appropriately mounted upon a pivot pin 28, as by the aid of one or more ears 29 carried by the lever. Lever 23 is shown, in this instance, as attached to a yielding membrane or diaphragm 30 by the aid of screws 31 passing through the diaphragm 30 and engaging a foot plate 35 on the upper side of the diaphragm. This diaphragm extends across an opening 32 in the wall 17, and is held in place by the screws 33 passing through a clamping ring 34.

The foot plate 35 is a part of an actuator member 36. The manner in which this actuator member is operated to rock the lever 23 between the closed position of Fig. 1 and the open position of Fig. 2 will be hereinafter described. It is sufficient, for the present, to note that the yielding diaphragm or wall 30 makes it possible to operate the lever 23, and therefore the supplemental valve closure, by a force external of the chamber 14.

All gaseous fuel supplied to both the main burner 1 and the pilot burner 3 must pass through the plug valve structure. Thus, manual operation of this plug valve from open to closed position serves to interrupt the flow of fuel at the inlet 6, and no fuel can pass to either of the burners 1 and 3 unless it be permitted by the position of the plug valve 10.

Fuel for the pilot burner 3 must pass through ports controlled by the position of the plug 10; also, in the active position, the pilot flame 2 must be in existence in order to maintain the passage of fuel to both the main burner 1 and the pilot burner 3.

In order to supply fuel to the pilot burner 3, when it is necessary to ignite pilot burner 3, it is, first of all, essential that the plug 10 be in an angular position where the passage of fuel to the main burner is interrupted.

To effect this result, a pilot burner port 37 (Figs. 5, 6, and 7) is provided in the body 15, shown as transverse to the inlet port 12 and the outlet port 13. This port may be formed by drilling, the end of the port being closed by a plug or screw 42. A slot 38, controlling passage of fuel to port 37, is formed in the plug 10 (see, also, Figs. 1 and 3). This slot forms a passage from the port 12 to the port 11 of the plug 10. In the position of Fig. 5, the port 11 is transverse to the ports 12 and 13 and, accordingly, there is an interruption in the flow of fuel between these two ports 12 and 13, and a corresponding interruption of the flow of fuel to the main burner 1. However, fuel can pass from the inlet port 12 through slot 38 and into port 37; thence it can pass into a passage 39 (see, also, Figs. 3 and 4) formed in the body 15. A port 40, forming a first auxiliary passage, communicates with passageway 39, and may be connected to a conduit 41 leading to other control elements of the system.

Fig. 6 illustrates the position of the plug 10 in which both the pilot burner 3, as well as the main burner 1, may be supplied with fuel. In this position, corresponding to a rotation of ninety degrees in the clockwise direction of the plug 10, the slot 38 still serves to pass fuel to the port 37 through the plug port 11. In the process of rotating the plug 10 from the position of Fig. 5 to that of Fig. 6, flow of fuel to the port 37 is never interrupted. This is true because slot 38 comes into registry with the port 37 before it is out of registry with port 12, and stays in registry until port 11 moves to a position where it may pass gas between the ports 12 and 13. In that position, fuel can pass to port 37 through the plug port 11.

If it be desired to shut off the system entirely, the plug 10 is rotated to the position of Fig. 7 either in the clockwise or counterclockwise direction. In this position, flow of fuel to the ports 13 and 37 is interrupted by the plug 10. This corresponds to a seasonal shut-off.

This manner of controlling the pilot port is described and claimed in an application, Ser. No. 55,119, entitled Automatic Safety Valve for Fuel Burners, and filed on October 18, 1948, in the name of William A. Ray, now Patent No. 2,653,622, issued September 29, 1953.

Assuming that the system is in the inactive position of Fig. 1, and that no flame exists at the pilot burner 3, fuel may be temporarily passed to the pilot burner for igniting it. For this purpose, a by-pass valve, forming a fuel path free of the automatic control elements, is provided. The manner in which this may be accomplished is described and claimed in another application filed December 27, 1949, in the name of William A. Ray under Ser. No. 135,117, now Patent No. 2,703,095, and entitled Fluid Control Safety Valve for Gaseous Fuels.

Thus, the passage 39 leads to a downwardly directed port 43 (see, particularly, Figs. 3 and 4). A port 44 communicates with this port, and is connected to a conduit 45, forming another auxiliary passage, and leading directly to the burner 3.

The supply of fuel to the passage 43 is controlled by a ball valve closure 46 that is seated on the tapered valve seat 47 at the upper end of the passage 43. This ball closure normally interrupts the flow of fuel from the pilot port 37 to the pilot burner 3, and is urged to the closed position illustrated in Fig. 4 by a compression spring 48. The upper end of this compression spring is confined by a headless screw 49 threaded into the body 15.

A push rod 50 extends downwardly through a cover member 51 that is fastened to the lower portion of the body member. This cover member 51 provides an outer race 52 (Fig. 3) for the ball bearings 53. An actuator or handle member 54 carries inner ball race 55, and is rotatably supported by the aid of the balls 53. This handle member 54 extends through an aperture in the cover member 51, and is held against removal by a spring ring 54a. The handle member or actuator 54 and the plug 10 are coupled by a lost motion connection. This is provided by a rectangular block 56 which extends loosely in a rectangular recess 57 in the actuator 54 and loosely into a slot 58 of the plug 10. A conical compression spring 59 is interposed between the cover member 51 and the plug 10 to urge the plug 10 resiliently against the seat 9.

All of this structure is described in the prior application, Ser. No. 135,117, now Patent No. 2,703,095.

A spring-pressed detent ball 60 (Fig. 3) is also indicated, and operates similarly to that disclosed in the said prior application for providing a yielding abutment against turning of the operator 54 to the fully inactive position of Fig. 7. The operator is thus apprised, by the resistance against turning, that further turning of the plug 10 from the position of Fig. 6 in the clockwise direction will serve to shut down the entire system for seasonal purposes, etc.

The operator 54 may have an indicating handle 62 mounted thereon for cooperating with an appropriate dial. It also carries a radially extending arm 63 adapted to cooperate with a crank lever 64 (Figs. 3 and 4). This crank lever is located in a recess 110 formed in plate 51. When the plug 10 is turned by the operator 54 somewhat beyond the closed position of Fig. 7, the arm 63 rotates this crank 64 about a pin 65 to lift the plunger 50 and unseat the ball 46. When this is accomplished, flow of fuel to the pilot burner 3 is effected through ports 38 and 37, passages 39 and 43, and passage 44 to the conduit 45. This operation thus makes it possible to ignite the pilot burner 3. After the pilot burner 3 is ignited, the handle or operator 54 is retracted by the operation of compression spring 48 without the necessity of moving the plug 10. This is effected since the operator 54 has a lost motion connection with the plug 10. The lever 64 has a rearwardly extending ear 111 limiting clockwise rotation of the lever by contact with the wall of recess 110.

After the pilot burner 3 is ignited, an electromagnet 66 (Figs. 1 and 2) is energized by heating of a thermocouple or thermopile structure 67. This is effected by the pilot burner flame 2, or an auxiliary flame, as is common in connection with thermocouple generators. The circuit for the electromagnet 66 is effected by the connections 68.

The electromagnet 66 is enclosed in an air-tight chamber 69, and serves to operate an armature 70 against the force of a spring 71. This type of electromagnet, operating with minute electric power, is described in Patent No. 2,615,511, hereinabove identified.

Leading to the chamber 69 is the conduit 41, and leading out of the chamber 69 is a conduit 72 terminating in a jet 74. Conduit 72 connects to conduit 45 and is therefore capable of passing fuel to the pilot burner 3.

In the unenergized position of Fig. 1, jet 74 is closed by the armature 70. Accordingly, flow of fuel is interrupted to the pilot burner 3 until the electromagnet 66 is energized. When it is energized, due to the existence of the flame 2, fuel then can pass to the pilot burner through port 37 and conduits 41, 72, and 45; and this passage of fuel is unaffected by the closing of the by-pass valve 46.

When the thermostat switch 19 demands more heat, and the pilot flame 2 is in existence, another electromagnet 75, similar to electromagnet 66, is energized through the switch 19 and thermocouple structure 67. This electromagnet is enclosed in a chamber 76, and operates an armature 77 in the same manner as armature 70 in the space 69.

In the unenergized position of Fig. 1, a jet 78, leading to a vent 79, is closed by the armature 77. An oppositely directed jet 80 is open. This jet 80 is in communication with the conduit 45, via an auxiliary passage 72' that communicates as well with conduit 72. Accordingly, in the unenergized position of electromagnet 75 as shown under Fig. 1, gas under pressure may enter the chamber 76. There it is free to pass, via conduit 81, to a chamber 82 formed above the wall 17. The upper wall of this chamber is formed by a flexible diaphragm 83 which forms, as well, the lower wall of a chamber 84. This chamber 84 is formed by a supplemental cover member 85.

In the unenergized position of Fig. 1, both chambers 82 and 84 are at equal pressure and, accordingly, the diaphragm 83 is urged upwardly by the aid of the light compression spring 86 to the position illustrated in Fig. 1. The diaphragm 83 is joined to the arm 36, as by the aid of the plate 87 and screws 88. In this unenergized position, therefore, the lever 23 has moved in a clockwise direction to move the supplemental valve closure 22 to the closed position.

When the thermostat switch 19 is closed and the pilot flame 2 is in existence, energy is passed to the electromagnet 75 and the armature 77 assumes the position of Fig. 2. In this position, the jet 80 is closed and jet 78 is open. Accordingly, chamber 82 is vented through conduit 81, chamber 76, and jet 78. However, gas pressure is still effective in chamber 84 above the diaphragm 83 and this diaphragm is therefore depressed. The supplemental valve lever 23 is then rotated to the open position indicated.

Should the flame 2 fail, both electromagnets 66 and 75 would be deenergized, and the system would assume the position of Fig. 1. It would then be necessary to reignite the pilot burner 3 by appropriate movement of the actuator 64 to open the pilot burner by-pass valve closure 46. When this is accomplished, as stated heretofore, pressure is supplied to both chambers 82 and 84 through the conduit 45, and the supplemental valve closure 22 remains closed, since the pressures in both chambers 82 and 84 are equal. Furthermore, the plug 10 must be in the closed position before this by-pass valve closure 46 can be lifted above the passage 43.

As soon as the pilot burner 3 is ignited, the thermocouple structure 67 generates sufficient electricity to operate the electromagnet 66, and then gas for the pilot burner 3 can pass through the conduit 41, jet 74, and conduit 72. The plug 10 can then be turned to the position illustrated in Fig. 6. Thereafter, opening and closing of the thermostat switch 19 determines the closing and opening of the supplemental valve closure 22.

If it is desired temporarily to shut down the system, as, for example, during the daytime, the plug 10 is turned to the position of Fig. 5. In this position, the pilot burner 3 is still supplied with fuel and, therefore, the flame 2 is maintained in existence. However, as soon as the flow of fuel by the plug 10 is interrupted, the operation of switch 19 has no effect upon the supply of fuel to the main burner 1.

The plug 10 may thereafter be turned to the open or on position of Fig. 6 at any time to make it possible for the main burner 1 to be supplied with fuel through the shut-off valve structure whenever the thermostat switch 19 demands more heat. On the other hand, seasonal shut-off may be effected by movement of the plug 10 to the position of Fig. 7, in which the supply of fuel to both the burners 1 and 3 is interrupted.

In the form of the invention illustrated in Figs. 8 and 9, the shut-off valve structure and the by-pass valve structure, etc., are arranged as before. The supplemental valve structure, in this case, includes an arm 89 which is pivoted upon a pin 90 located in the chamber 91 above the plug valve structure. The valve closure 22 is carried at the end of this lever.

Movement of the valve closure 22 to open position in this instance is effected magnetically. For this purpose, a thin wall 92 of non-magnetic material defines the chamber 91. The edge 94 of the wall 92 is disposed on the flange 95 of the valve body 96. Disposed above this edge 94 is the edge of a flexible wall or diaphragm 93, and a supplemental cover member 97 is fastened to the flange 95.

In this way, pressure chambers 98 and 99 are formed on the lower and upper side of the diaphragm 93.

Diaphragm 93 carries a permanent magnet 100 on its lower face, and is held to it as by a screw 101 passing through a plate 102. A compression spring 103 urges the diaphragm 93 upwardly.

In the inactive position of Fig. 8, the permanent magnet 100 is spaced from the armature 104, carried by lever 89, and is, therefore, incapable of attracting the armature 104. However, when chamber 99 attains a pressure greater than that in chamber 98 (as described in connection with chambers 82 and 84 of Figs. 1 and 2) the permanent magnet 100 is urged downwardly into contact with the upper surface of the wall 92, and the spring 103 is compressed, as indicated in Fig. 9. In this position, the permanent magnet 100 has approached armature 104, and is powerful enough to attract it and to lift the valve closure 22 off seat 20. When the thermostat switch opens, or in the event of pilot flame failure, the pressures in chambers 98 and 99 are equalized in a manner heretofore described. The spring 103 is then effective to move the permanent magnet 100 upwardly and to a position in which armature 104 is no longer attracted. Accordingly, this armature 104 and the lever 89 assume the inactive position of Fig. 8.

The inventor claims:

1. In a valve structure: a valve body defining a plug closure seat; said body having inlet and outlet ports opening in said seat; a rotary plug closure in the seat; said closure having a main port opening cooperating with said inlet and outlet ports; means forming a chamber in communication with the outlet port; means defining a passage out of said chamber and defining a supplemental valve seat; a movable supplemental closure member in the chamber and cooperating with said supplemental valve seat; said body also having a pair of auxiliary passages, and a common passage leading to both of said auxiliary passages; said plug closure having an auxiliary port optionally connecting said common passage either to the inlet port or the outlet port; an auxiliary valve in one of the auxiliary passages; and means for opening said auxiliary valve in response to angular movement of the plug closure only to that position in which the common passage is connected via the auxiliary plug port, to the inlet port.

2. In a valve structure: a valve body defining a plug closure seat; said body having inlet and outlet ports opening in said seat; a rotary plug closure in the seat; said closure having a main port opening cooperating with said inlet and outlet ports; means forming a chamber in communication with the outlet port; means defining a passage out of said chamber and defining a supplemental valve seat; a movable supplemental closure member in the chamber and cooperating with said supplemental valve seat; said body also having a pair of auxiliary passages, and a common passage leading to both of said auxiliary passages; said plug closure having an auxiliary port optionally connected said common passage either to the inlet port or the outlet port; an auxiliary valve in one of the auxiliary passages; means for opening said auxiliary valve in response to angular movement of the plug closure only to that position in which the common passage is connected via the auxiliary plug port, to the inlet port; and condition responsive means for controlling the other of the said auxiliary passages.

3. In a control system: a main gas burner; a pilot burner for said main burner; a valve body defining a plug closure seat; said body having inlet and outlet ports opening in said seat; a rotary plug closure in the seat; said closure having a main port opening cooperating with said inlet and outlet ports; means forming a chamber in communication with the outlet port; means defining a passage out of said chamber to the main burner, and defining a supplemental valve seat; a movable supplemental closure member in the chamber and cooperating with said supplemental valve seat; said body also having a pair of auxiliary passages for optionally supplying fuel to the pilot burner as well as a common passage leading to both of said auxiliary passages; said plug closure having an auxiliary port optionally connecting said common passage either to the inlet port or the outlet port; an auxiliary valve in one of the auxiliary passages; and means for opening said auxiliary valve in response to angular movement of the plug closure only in a direction to connect the common passage to the inlet port.

4. In a control system: a main gas burner; a pilot burner for said main burner; a valve body defining a plug closure seat; said body having inlet and outlet ports opening in said seat; a rotary plug closure in the seat; said closure having a main port opening cooperating with said inlet and outlet ports; means forming a chamber in communication with the outlet port; means defining a passage out of said chamber to the main burner, and defining a supplemental valve seat; a movable supplemental closure member in the chamber and cooperating with said supplemental valve seat; said body also having a pair of auxiliary passages for optionally supplying fuel to the pilot burner, as well as a common passage leading to both of said auxiliary passages; said plug closure having an auxiliary port optionally connecting said common passage either to the inlet port or the outlet port; an auxiliary valve in one of the auxiliary passages; means for opening said auxiliary valve in response to angular movement of the plug closure only in a direction to connect the common passage to the inlet port; and condition responsive means controlling the other of said auxiliary passages.

5. In a control system: a main gas burner; a pilot burner for said main burner; a valve body defining a plug closure seat; said body having inlet and outlet ports opening in said seat; a rotary plug closure in the seat; said closure having a main port opening cooperating with said inlet and outlet ports; means forming a chamber in communication with the outlet port; means defining a passage out of said chamber to the main burner, and defining a supplemental valve seat; a movable supplemental closure member in the chamber and cooperating with said supplemental valve seat; said body also having a pair of auxiliary passages for optionally supplying fuel to the pilot burner, as well as a common passage leading to both of said auxiliary passages; said plug closure having an auxiliary port optionally connecting said common passage either to the inlet port or the outlet port; an auxiliary valve in one of the auxiliary passages; means for opening said auxiliary valve in response to angular movement of the plug closure only in a direction to connect the common passage to the inlet port; and means responsive to temperature conditions for operating said supplemental closure.

6. In a valve structure: a valve body defining a closure seat; a rotary closure cooperating with the seat; said closure having a main port opening cooperating with inlet and outlet ports in the body for the passage of fluid; means forming a chamber communicating with the outlet port; means defining a passage from said chamber and forming a supplemental valve seat; a movable supplemental closure member in the chamber and cooperating with said supplemental valve seat; said main valve closure and its seat having auxiliary ports for controlling the passage of fluid from the inlet port to a pair of auxiliary passages in the body; means forming a third passage to which both auxiliary passages lead; said auxiliary ports being in fluid passing relation at a position of the main closure that interrupts flow between the inlet and outlet ports of the body; an auxiliary valve in one of said auxiliary passages; means for operating said auxiliary valve; and fluid pressure operated means for moving the supplemental valve closure; said auxiliary valve when open, passing fluid from the main inlet port through the corresponding auxiliary passage, to said third passage, and thence to the fluid pressure operated means.

7. In a control system for the supply of gaseous fuel: a main burner; a pilot burner for said main burner; a main valve structure having a movable closure and inlet and outlet openings; a supplemental valve structure interposed between the outlet opening and the main burner; said main valve structure and its closure having cooperating ports for passing fuel to the pilot burner; means forming first and second passages, both connected to a third passage leading to the pilot burner; said first and second passages being controlled by said cooperating ports; means responsive to the existence of a pilot flame for causing fuel to pass to the pilot burner through the first passage; and valve means effective only when the main valve structure is closed, for causing fuel to pass through the second passage to said third passage; said valve means, when closed, being effective to interrupt flow of fuel between the third and said second passage.

8. In a control system for the supply of gaseous fuel: a main burner; a pilot burner for said main burner; a main valve structure having a movable closure and inlet and outlet openings; a supplemental valve structure interposed between the outlet opening and the main burner; said main valve structure and its closure having cooperating ports for passing fuel to the pilot burner; means forming first and second passages, both connected to a third passage leading to the pilot burner; said first and second passages being controlled by said cooperating ports; means operated by the fluid pressure of the fuel for opening and closing the supplemental valve structure; said third passage also leading to said fluid pressure operated means; means responsive to a condition and to the existence of the pilot flame for causing said fluid pressure to open the supplemental valve structure; means responsive to the existence of a pilot flame for causing fuel to be passed through the third passage to the pilot burner from one of said passages; and valve means operated by movement of the main valve closure to closed position, for causing fuel to pass through the second passage to said third passage; said valve means, when closed, being effective to interrupt flow of fuel between the third passage and the second passage.

9. In a control system for the supply of gaseous fuel: a main burner; a pilot burner for said main burner; a main plug valve structure having a rotatable plug closure and inlet and outlet openings; a supplemental valve structure interposed between the outlet opening and the main burner; said main valve structure and its plug closure having cooperating ports for passing fuel to the pilot burner; means forming three passages, the first and second passages connecting to the third passage; said third passage leading to the pilot burner; said first and second passages being controlled by said cooperating ports; means responsive to the existence of a pilot flame for causing fuel to pass to the pilot burner through the first and third passages; and valve means effective only when the plug closure is moved to interrupt flow between the inlet and the outlet openings, for causing fuel to pass to the pilot burner through the second and third passages; said valve means, when closed, being so placed that it interrupts flow of fuel between the third passage and the second passage.

10. In a control system for the supply of gaseous fuel: a main burner; a pilot burner for said main burner; a main plug valve structure having a rotatable plug closure and inlet and outlet openings; a supplemental valve structure interposed between the outlet opening and the main burner; said main valve structure and its plug closure having cooperating ports for passing fuel to the pilot burner; means forming three passages, the first and second passages connecting to the third passage; said third passage leading to the pilot burner; said first and second passages being controlled by said cooperating ports; means operated by the fluid pressure of the fuel for opening and closing the supplemental valve structure; said third passage also leading to said fluid pressure operated means; means responsive to a condition and to the existence of the pilot flame for causing said fluid pressure to open the supplemental valve structure; means responsive to the existence of a pilot flame for causing fuel to be passed through the third passage to the pilot burner from one of said passages; and valve means operated by movement of the main valve closure to closed position, for causing fuel to pass through the second passage to said third passage; said valve means, when closed, being effective to interrupt flow of fuel between the third passage and the second passage.

11. In a valve structure: a valve body defining a closure seat; a rotary closure cooperating with the seat; said closure having a main port opening cooperating with inlet and outlet ports in the body for the passage of fluid; means forming a chamber communicating with the outlet port; means defining a passage from said chamber and forming a supplemental valve seat; a movable supplemental closure member in the chamber and cooperating with said supplemental valve seat; said main valve closure and its seat having auxiliary ports for controlling the passage of fluid from the inlet port to a pair of auxiliary passages in the body; means forming a third passage to which both auxiliary passages lead; said auxiliary ports being in fluid passing relation at a position of the main closure that interrupts flow between the inlet and outlet ports of the body; an auxiliary valve in one of said auxiliary passages; means for operating said auxiliary valve; fluid pressure operated means for moving the supplemental closure to either open or closed position, including a pair of conduits connnected in parallel to said third passageway, and condition responsive means for passing fluid to at least one of said pair of conduits.

References Cited in the file of this patent
UNITED STATES PATENTS

| | | |
|---|---|---|
| 1,875,388 | Magner | Sept. 6, 1932 |
| 2,231,158 | Davis | Feb. 11, 1941 |
| 2,305,848 | Dobler | Dec. 22, 1942 |
| 2,353,848 | Ray | July 18, 1944 |
| 2,372,564 | Engholdt | Mar. 27, 1945 |
| 2,411,230 | Ray | Nov. 19, 1946 |
| 2,412,235 | Denberg | Dec. 10, 1946 |
| 2,422,368 | Ray | June 17, 1947 |
| 2,533,491 | McMahon | Dec. 12, 1950 |
| 2,564,894 | Glasgow | Aug. 21, 1951 |
| 2,575,086 | Atchison | Nov. 13, 1951 |
| 2,615,511 | Ray | Oct. 28, 1952 |